US012005594B1

(12) United States Patent
Marfione

(10) Patent No.: US 12,005,594 B1
(45) Date of Patent: Jun. 11, 2024

(54) POCKET KNIFE

(71) Applicant: Anthony L. Marfione, Mills River, NC (US)

(72) Inventor: Anthony L. Marfione, Mills River, NC (US)

(73) Assignee: Microtech Knives, Inc., Mills River, NC (US)

( * ) Notice: Subject to any disclaimer, the term of this patent is extended or adjusted under 35 U.S.C. 154(b) by 0 days.

(21) Appl. No.: 18/418,234

(22) Filed: Jan. 20, 2024

(51) Int. Cl.
*B26B 1/08* (2006.01)
*B26B 1/10* (2006.01)

(52) U.S. Cl.
CPC . *B26B 1/08* (2013.01); *B26B 1/10* (2013.01)

(58) Field of Classification Search
CPC .... B26B 1/08; B26B 1/10; B26B 5/00; B26B 5/001; B26B 5/003; B26B 5/005
USPC .............................................................. 30/162
See application file for complete search history.

(56) References Cited

U.S. PATENT DOCUMENTS 2,632,949 A * 3/1953 Falcone .................... B26B 1/08 30/162
4,139,939 A * 2/1979 Crooks ..................... B26B 1/08 30/162
4,769,912 A * 9/1988 Davis ........................ B26B 1/08 30/162
6,085,423 A 7/2000 Marifone
7,305,769 B2 12/2007 McHenry
7,562,455 B2 7/2009 McHenry
7,574,804 B2 8/2009 Bezold
7,797,838 B2 * 9/2010 Chu .......................... B26B 1/10 30/162
8,595,941 B2 12/2013 Lee
8,671,578 B1 3/2014 Frazer
8,966,771 B2 * 3/2015 Chu .......................... B26B 1/08 30/162
9,056,398 B2 * 6/2015 Liao ........................ B26B 5/001
9,375,854 B2 6/2016 Chu
9,498,889 B1 11/2016 Hawk
9,764,485 B1 9/2017 Hawk
D810,540 S * 2/2018 Marfione ......................... D8/99
10,220,527 B1 3/2019 Marfione
D870,532 S * 12/2019 Marfione ......................... D8/99
D871,187 S * 12/2019 Marfione ......................... D8/99
10,500,740 B1 12/2019 Marfione et al.
D871,887 S * 1/2020 Marfione ......................... D8/99
D886,563 S * 6/2020 Marfione ......................... D8/99
D889,239 S * 7/2020 Marfione ......................... D8/99
10,807,253 B1 10/2020 Mandeville
(Continued)

FOREIGN PATENT DOCUMENTS

WO WO 2019/104295 A1 5/2019

*Primary Examiner* — Jason Daniel Prone
(74) *Attorney, Agent, or Firm* — Steve LeBlanc, LLC

(57) ABSTRACT

A pocket knife includes a chassis, a surface defined by the chassis, and a blade having a retracted position in which the blade is locked inside of the chassis and a deployed position in which at least a portion of the blade is locked outside of the chassis. An actuator is slidingly engaged with the chassis to reposition the blade between the retracted and deployed positions. A stop pin is connected to the blade. An end of the stop pin extends a predetermined distance from the blade to engage with the surface defined by the chassis when the blade is in the deployed position to prevent movement of the blade with respect to the chassis.

19 Claims, 11 Drawing Sheets

(56) References Cited

U.S. PATENT DOCUMENTS

| | | | | | |
|---|---|---|---|---|---|
| D903,459 | S * | 12/2020 | Marfione | D8/99 | |
| D903,460 | S * | 12/2020 | Marfione | D8/99 | |
| 10,889,013 | B2 * | 1/2021 | Scimone | B26B 5/001 | |
| 11,207,790 | B2 * | 12/2021 | Buerk | B26B 5/00 | |
| 11,358,291 | B2 * | 6/2022 | Buerk | B26B 1/08 | |
| 11,607,818 | B1 | 3/2023 | Crawford et al. | | |
| 11,639,006 | B1 * | 5/2023 | Chumchal | B26B 5/001 | 30/162 |
| 11,826,920 | B1 * | 11/2023 | Mandeville | B26B 5/003 | |
| D1,012,661 | S * | 1/2024 | Chumchal | D8/99 | |
| 2006/0207102 | A1 | 9/2006 | Bezold | | |
| 2007/0175045 | A1 | 8/2007 | McHenry | | |
| 2008/0222895 | A1 | 9/2008 | Marfione | | |
| 2008/0222897 | A1 | 9/2008 | Marfione | | |
| 2009/0235534 | A1 | 9/2009 | Chu | | |
| 2012/0255179 | A1 * | 10/2012 | Moizis | B26B 1/08 | 30/162 |
| 2014/0101943 | A1 | 4/2014 | Chu | | |
| 2014/0173911 | A1 | 6/2014 | Chu | | |
| 2021/0276204 | A1 * | 9/2021 | Marfione | B26B 1/10 | |
| 2021/0299893 | A1 * | 9/2021 | Eckelkamp | B26B 1/10 | |
| 2022/0055233 | A1 * | 2/2022 | Delplanche | B26B 1/08 | |
| 2022/0388186 | A1 * | 12/2022 | King | B26B 1/08 | |

* cited by examiner

POCKET KNIFE

FIELD OF THE INVENTION

The present invention generally involves a pocket knife. In particular embodiments, the pocket knife may be a double action, out-the-front configuration.

BACKGROUND OF THE INVENTION

Pocket knives provide a convenient tool for cutting that may be easily carried by a user for deployment when desired. For some pocket knife designs, two hands are needed to deploy and retract a blade, while other designs include a spring that assists a user to deploy and/or retract the blade using a single hand. Each design balances the convenience and speed of operation with increased risk associated with inadvertent operation.

A double action out-the-front pocket knife typically includes an actuator slidingly engaged with a chassis to deploy and retract the blade. The actuator controls the operation of a slider, front and rear operators connected by a spring, and front and rear locks inside the chassis. To deploy the blade in a double action out-the-front pocket knife, the actuator may be moved forward to move the slider forward. Forward movement of the slider moves the front operator forward while the rear operator is engaged with the rear of the blade to charge the spring. Forward movement of the slider eventually releases the rear lock to allow the rear operator, under the force of the charged spring, to deploy the blade. The front lock engages with the deployed blade to hold the blade in the deployed position. To retract the blade in a double action out-the-front pocket knife, the actuator is moved rearward to move the slider rearward. Rearward movement of the slider moves the rear operator rearward while the front operator is engaged with the blade to charge the spring. Rearward movement of the slider eventually releases the front lock to allow the front operator, under the force of the charged spring, to retract the blade. The rear lock engages with the retracted blade to hold the blade in the retracted position.

Although a double action out-the-front pocket knife provides convenient one-handed operation, the manufacturing tolerances and designed clearances between the various components that provide the double action functionality result in slight longitudinal and/or axial movement or play between the blade and the chassis when the blade is locked in the deployed position. This slight movement or play reduces the precision and usefulness of a double action out-the-front pocket knife compared to a folding or fixed blade knife. Therefore, the need exists for an improved double action out-the-front pocket knife that reduces or eliminates movement or play between the blade and the chassis when the blade is locked in the deployed position.

BRIEF DESCRIPTION OF THE INVENTION

Aspects and advantages of the invention are set forth below in the following description, or may be obvious from the description, or may be learned through practice of the invention.

One embodiment of the present invention is a pocket knife that includes a chassis, a surface defined by the chassis, and a blade having a retracted position in which the blade is locked inside of the chassis and a deployed position in which at least a portion of the blade is locked outside of the chassis. An actuator is slidingly engaged with the chassis to reposition the blade between the retracted and deployed positions. A stop pin is connected to the blade. An end of the stop pin extends a predetermined distance from the blade to engage with the surface defined by the chassis when the blade is in the deployed position to prevent movement of the blade with respect to the chassis.

An alternate embodiment of the present invention is a pocket knife that includes a chassis and a blade having a retracted position in which the blade is inside of the chassis and a deployed position in which at least a portion of the blade is outside of the chassis. An actuator is slidingly engaged with the chassis to reposition the blade between the retracted and deployed positions. A lock is pivotally connected to the chassis and engaged with the blade in the deployed position to lock the blade in the deployed position. A stop pin is connected to the blade. An end of the stop pin extends a predetermined distance from the blade to engage with the chassis when the blade is in the deployed position to prevent movement of the blade with respect to the chassis.

In yet another embodiment of the present invention, a pocket knife includes a chassis and a blade having a retracted position in which the blade is locked inside of the chassis and a deployed position in which at least a portion of the blade is locked outside of the chassis. An actuator is slidingly engaged with the chassis to reposition the blade between the retracted and deployed positions. The pocket knife further includes a means for preventing movement of the blade with respect to the chassis when the blade is in the deployed position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
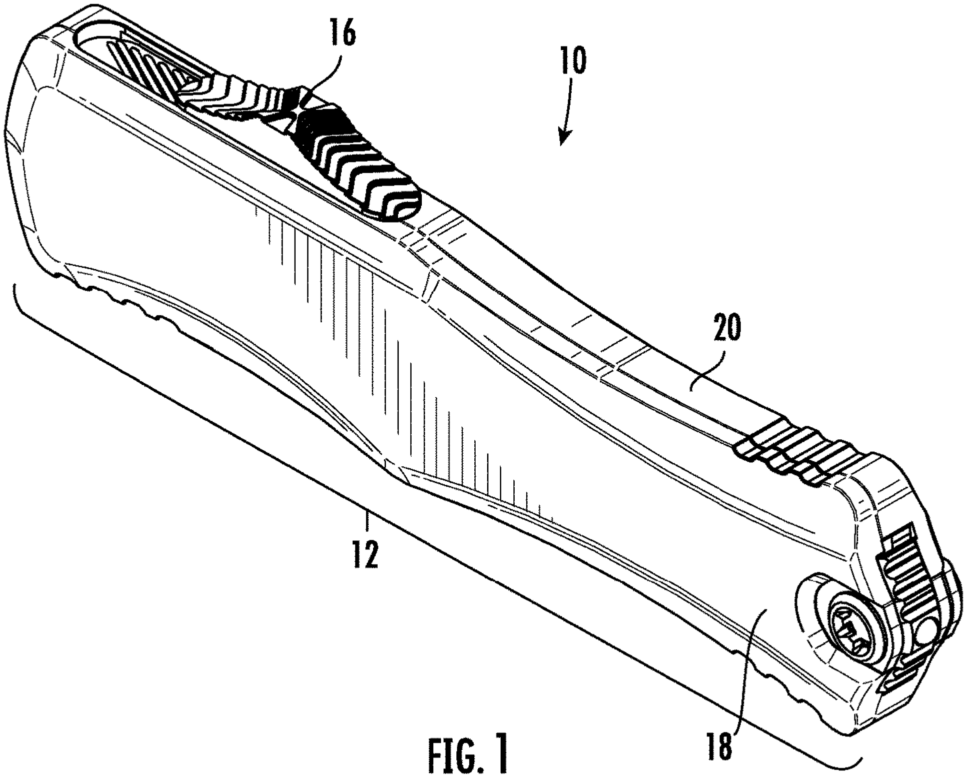
FIG. 1 is a perspective view of a pocket knife according to one embodiment of the present invention in a retracted position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a pocket knife that reduces or eliminates movement or play between the blade and the chassis when the blade is locked in the deployed position. For convention of reference in describing the embodiments shown in the figures, the term “front” shall refer to the end of the pocket knife from which a blade deploys; the term “rear” shall refer to the end of the pocket knife that is opposite from the front; the term “forward” shall refer to the direction toward the front of the pocket knife; the term “rearward” shall refer to the direction away from the front of the pocket knife; the term “top” shall refer to the side of the pocket knife that houses an actuator for operating the pocket knife; the term “bottom” shall refer to the side of the pocket knife that is opposite from the top; and the terms “left” and “right” shall refer to the opposing sides of the pocket knife that are adjacent to and generally perpendicular to the top and bottom. As used herein, the term “longitudinal” shall refer to the direction between the front and rear of the pocket knife, and the term “axial” shall refer to the direction perpendicular to the longitudinal direction.

Figure 2:
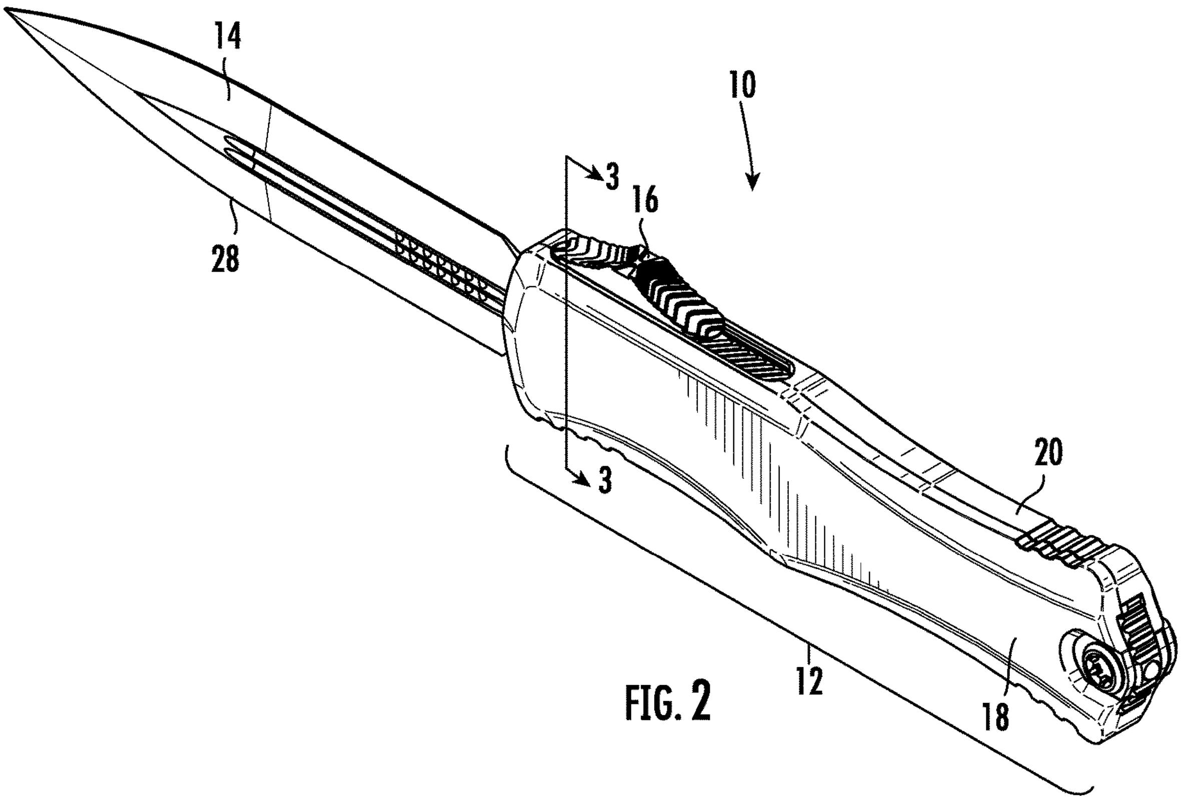
FIG. 2 is a perspective view of the pocket knife shown in FIG. 1 in a deployed position.
Figure 3:
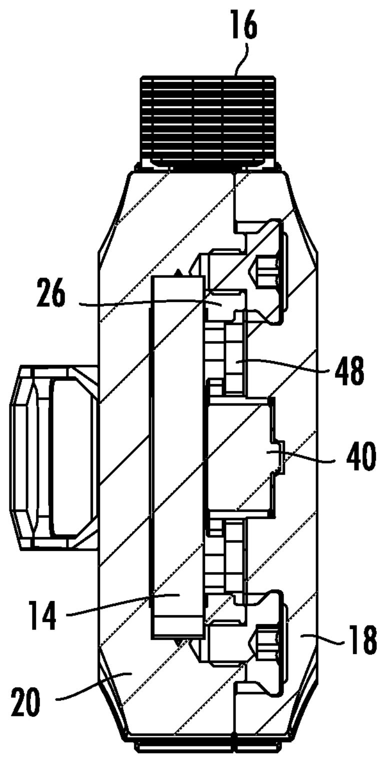
FIG. 3 is an axial cross-section of the pocket knife shown in FIG. 2 taken along 3-3.

FIGS. 1 and 2 provide perspective views of a pocket knife 10 according to one embodiment of the present invention in retracted and deployed positions, respectively, and FIG. 3 provides an axial cross-section of the pocket knife 10 shown in FIG. 2 taken along 3-3. As shown in FIGS. 1-3, the pocket knife 10 generally includes a chassis 12, a blade 14, and an actuator 16.

The chassis 12 provides a frame for supporting the various components associated with the pocket knife 10 and may be molded, pressed, or machined from plastics, metals, polymers, or any material or combination of materials having the desired strength and durability. The chassis 12 generally includes a first or left scale 18 opposed to a second or right scale 20, and when assembled together, the first and second scales 18, 20 produce a cavity 26 (shown in FIG. 3) inside the chassis 12.

Figure 10:
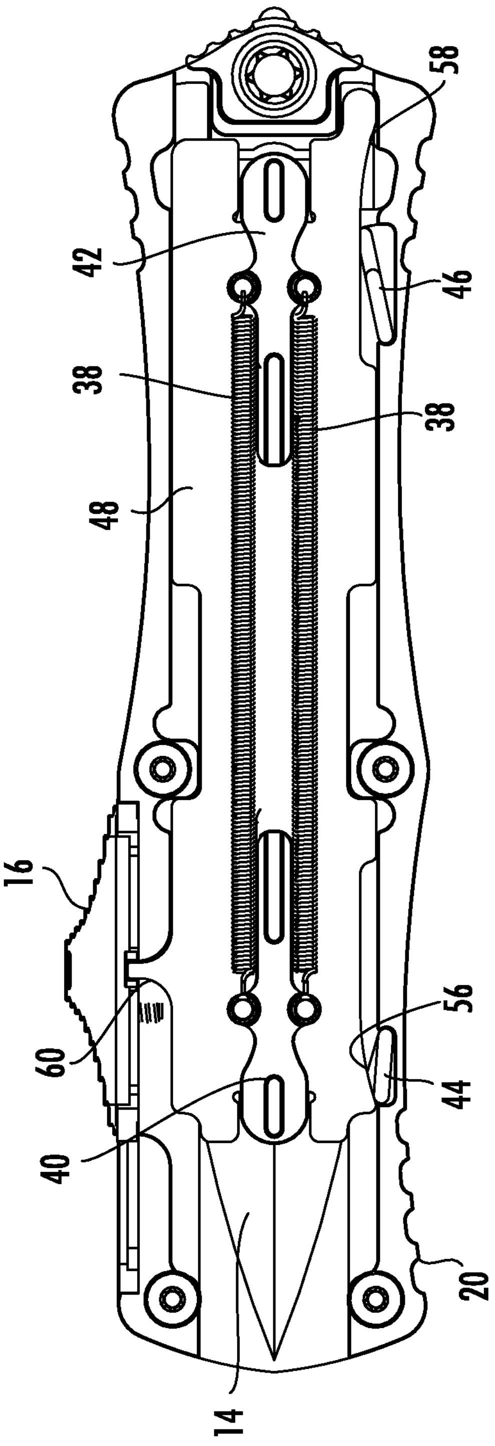
FIG. 10 is a left plan view of the pocket knife shown in FIGS. 1-4 with the left scale removed, the blade in the retracted position, the actuator in the shut position, the slider in the rear position, and the rear lock engaged with the blade.
Figure 11:
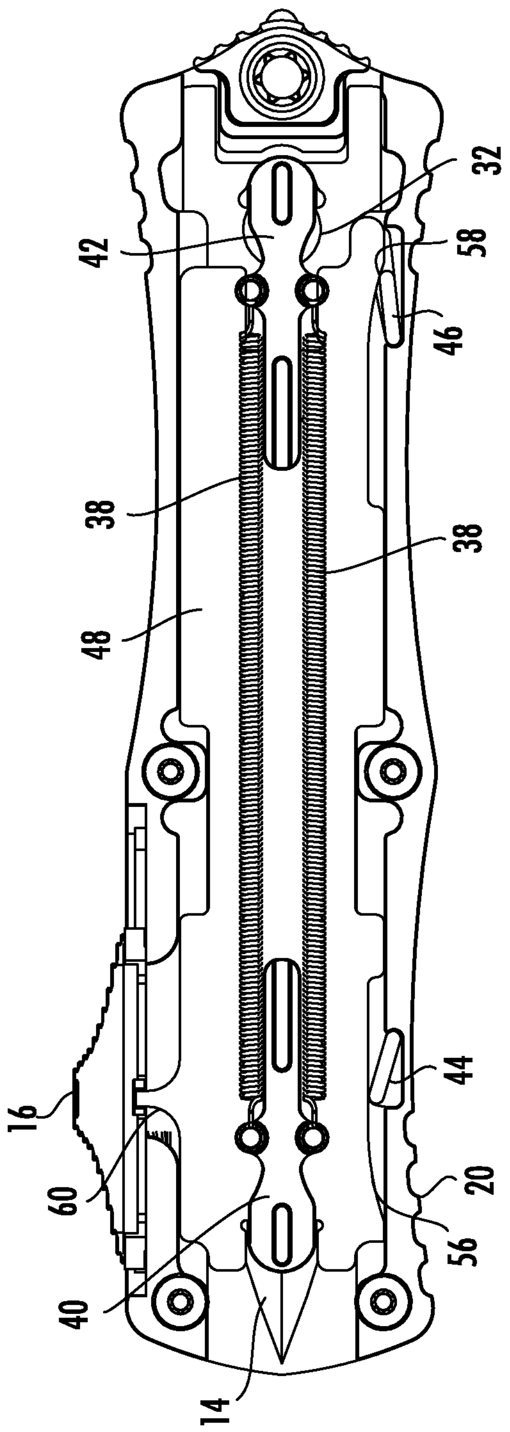
FIG. 11 is a left plan view of the pocket knife shown in FIGS. 1-4 with the left scale removed, the blade in the retracted position, the actuator in the open position, the slider in the front position, and the rear lock released from the blade.
Figure 12:
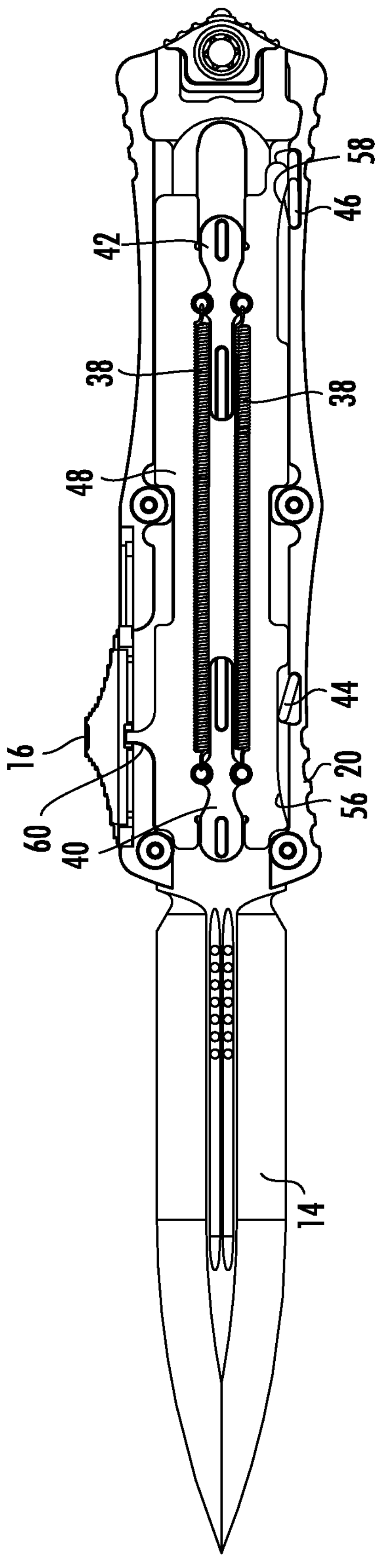
FIG. 12 is a left plan view of the pocket knife shown in FIGS. 1-4 with the left scale removed, the blade in the deployed position, the actuator in the open position, the slider in the front position, and the front lock engaged with the blade.
Figure 13:
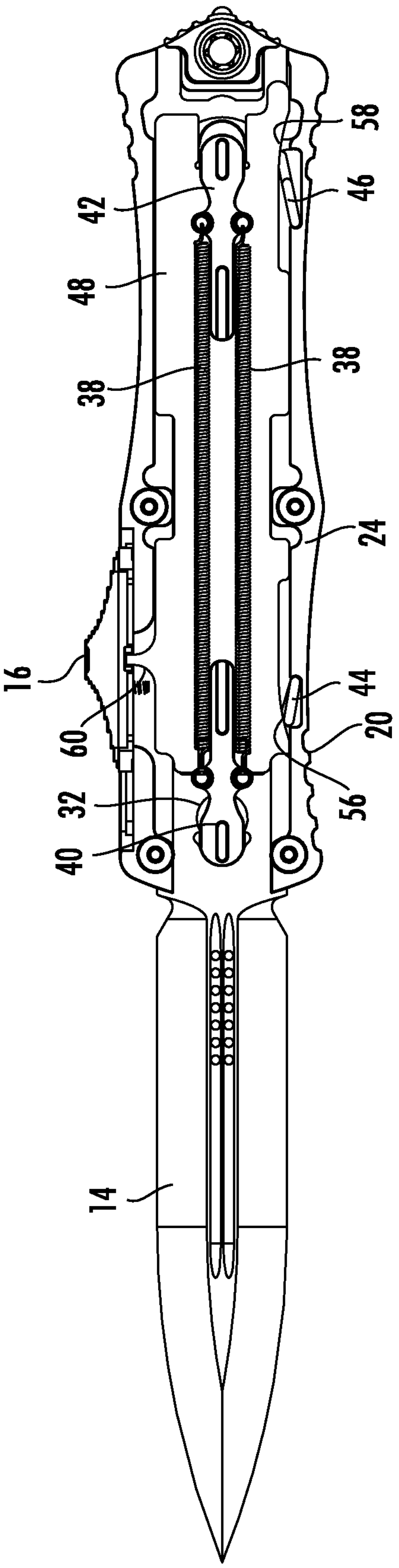
FIG. 13 is a left plan view of the pocket knife shown in FIGS. 1-4 with the left scale removed, the blade in the deployed position, the actuator in the shut position, the slider in the rear position, and the front lock released from the blade.

The blade 14 generally has one or more cutting edges 28 and can move between retracted and deployed positions. In the retracted position, as shown in FIGS. 1, 10, and 11, the cutting edge 28 is inside of the cavity 26 or between the first and second scales 18, 20 to shield the cutting edge 28 from inadvertent contact that might damage the blade 14 or cause harm to personnel or objects. In the deployed position, as shown in FIGS. 2, 12, and 13, the cutting edge 28 is outside of the cavity 26 of the chassis 12 to allow use of the cutting edge 28 as desired.

For the embodiments shown in FIGS. 1-3, the actuator 16 is in sliding contact with the top of the chassis 12 and controls the operation of the pocket knife 10. The actuator 16 has a shut or rear position, shown in FIGS. 1, 10, and 13, that moves the blade 14 to the retracted position and an open or front position, shown in FIGS. 2, 11, and 12, that moves the blade 14 to the deployed position.

Figure 4:
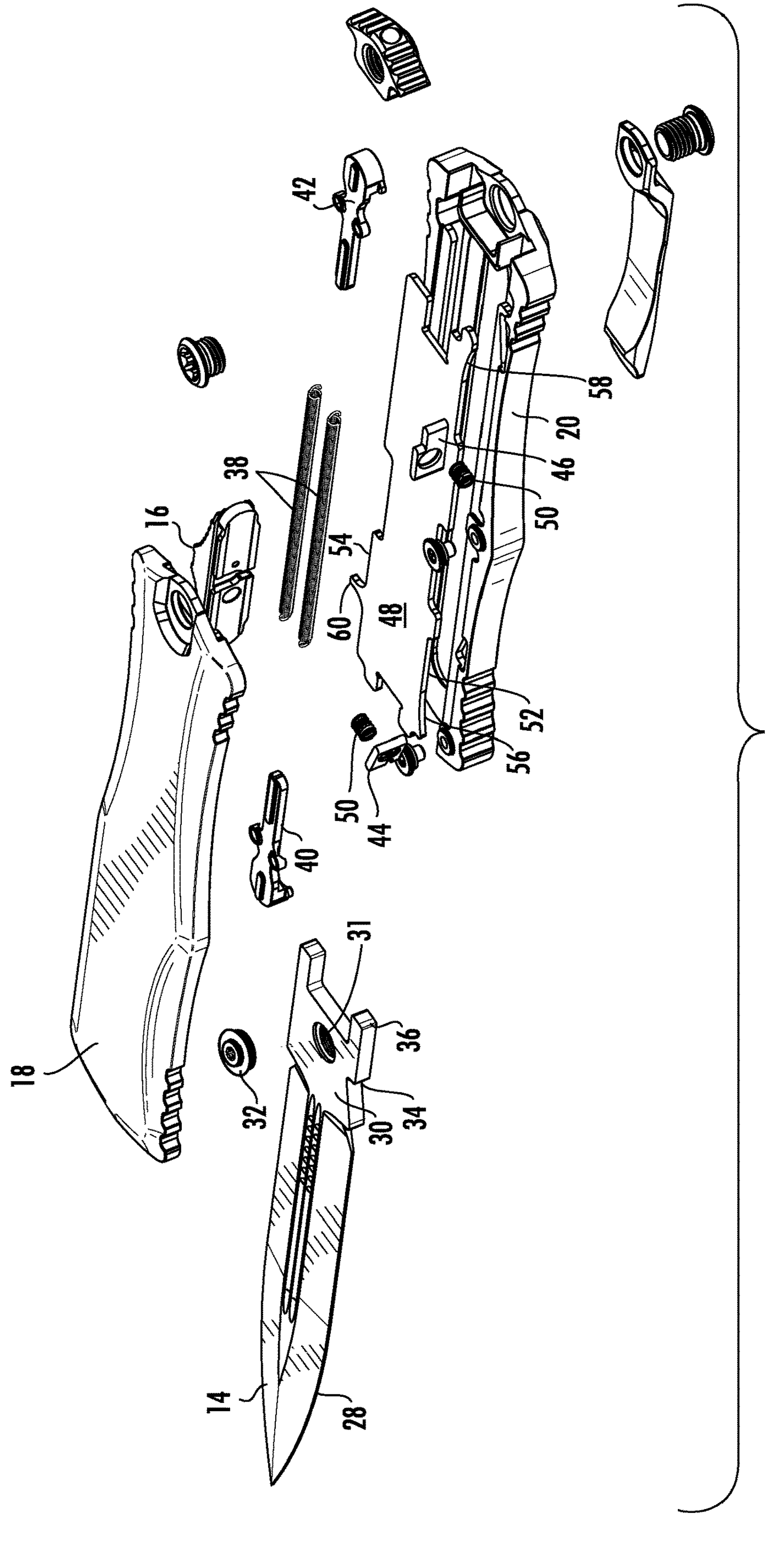
FIG. 4 is an exploded view of the pocket knife shown in FIGS. 1-3 according to one embodiment of the present invention.

FIG. 4 provides an exploded view of the pocket knife 10 shown in FIGS. 1-3 according to one embodiment of the present invention. As shown in FIG. 4, the rear portion of the blade 14 generally includes a tang 30, and the tang 30 of the blade 14 may include an aperture 31 and a notch 34 longitudinally separated from a rear surface 36 of the blade 14. The aperture 31 is sized and shaped to receive a stop pin 32 which will be described in more detail with respect to FIGS. 5-8. In particular embodiments, the stop pin 32 may be simply a projection from the tang 30, while in other embodiments, as shown in FIG. 4, the stop pin 32 may be a separate part threaded or press-fit into the tang 30. The notch 34 may be on one or both sides of the tang 30. The purpose and operation of the stop pin 32, notch 34, and rear surface 36 will be described in more detail with respect to operation of the blade 14 between the retracted and deployed positions as shown in FIGS. 10-13.

As shown most clearly in FIG. 4, one or more springs 38, front and rear operators 40, 42, front and rear locks 44, 46, and a slider 48 may be located inside the cavity 26 of the chassis 12. The springs 38 connect the front operator 40 to the rear operator 42. Although the front and rear operators 40, 42 shown in FIG. 4 are identical, they may not be identical in particular embodiments, and the present invention is not limited to identical front and rear operators 40, 42 unless recited in the claims. As will be explained in more detail with respect to FIGS. 10-13, the front and rear operators 40, 42 alternately engage with the stop pin 32 and the slider 48 to move the blade 14 between the retracted and deployed positions.

The front and rear locks 44, 46 may be pivotally connected to the chassis 12 and biased radially inward in the cavity 26 by springs 50. With the blade 14 in the retracted position, the rear lock 46 is in biased engagement with the notch 34 in the tang 30 to lock the blade 14 inside of the chassis 12. Conversely, with the blade 14 in the deployed position, the front lock 44 is in biased engagement with the rear surface 36 of the tang 30 to lock at least a portion of the blade 14 outside of the chassis 12.

The slider 48 has a bottom side 52 opposed to a top side 54 with a front sloped surface 56 and a rear sloped surface 58 on either of the bottom or top sides 52, 54. In the particular embodiment shown in FIG. 4, the front and rear sloped surfaces 56, 58 are located or defined on the bottom side 52 of the slider 48 to engage with the front and rear locks 44, 46 as the slider 48 moves longitudinally in the cavity 26. In alternate embodiments, the front and rear sloped surfaces 56, 58 may be located or defined on opposite sides 52, 54 of the slider 48 to correspond to the positions of the associated front and rear locks 44, 46, and the present invention is not limited to the specific location of the front and rear sloped surfaces 56, 58 unless specifically recited in the claims.

A tab 60 may extend from whichever side of the slider 48 is closest to the actuator 16 so that the tab 60 engages with the actuator 16 and the actuator 16 and the slider 48 move together. In the particular embodiment shown in FIG. 4, for example, the tab 60 extends from the top side 54 of the slider 48. In this manner, forward and rearward movement of the actuator 16 moves the slider 48 the same direction and distance.

The slider 48 has a rear position that moves the blade 14 to the retracted position and a front position that moves the blade 14 to the deployed position. Specifically, with the slider 48 in the front position and the blade 14 locked in the deployed position, as the slider 48 moves to the rear position, the slider 48 engages with the rear operator 42 to increase tension in the springs 38. Rearward movement of the slider 48 causes the front sloped surface 60 to engage with the front lock 44 to pivot the front lock 44 outward, disengaging the front lock 44 from the rear surface 36 of the tang 30 to allow the springs 38 to pull the front operator 40 against the stop pin 32 in the tang 30 to move the blade 14 to the retracted position. When the blade 14 reaches the retracted position, the spring 50 pushes the rear lock 46 pivotally into biased engagement with the notch 34 in the tang 30 to lock the blade 14 in the retracted position inside of the chassis 12. Conversely, with the slider 48 in the rear position and the blade 14 locked in the retracted position, as the slider 48 moves to the front position, the slider 48 engages with the front operator 40 to increase tension in the springs 38. Forward movement of the slider 48 causes the rear sloped surface 62 to engage with the rear lock 46 to pivot the rear lock 46 outward, disengaging the rear lock 46 from the notch 34 in the tang 30 of the blade 14 to allow the springs 38 to pull the rear operator 42 against the stop pin 32 in the tang 30 to move the blade 14 to the deployed position. When the blade 14 reaches the deployed position, the spring 50 pushes the front lock 44 pivotally into biased engagement with the rear surface 36 of the tang 30 to lock the blade 14 in the deployed position with at least a portion of the blade 14 outside of the chassis 12.

When the blade 14 is in the deployed position, the front lock 44 is in biased engagement with the rear surface of the tang 40 to prevent the blade 14 from leaving the deployed position. However, the manufacturing tolerances and designed clearances between the various components that provide the double action functionality result in slight longitudinal and/or axial movement or play between the blade 14 and the chassis 12 when the blade 14 is locked in the deployed position. This slight movement or play reduces the precision and usefulness of the pocket knife 10 compared to a folding or fixed blade knife. Therefore, embodiments of the present invention include a means for preventing movement of the blade 14 with respect to the chassis 12 when the blade 14 is in the deployed position. The function of the means is to prevent movement of the blade 14 with respect to the chassis 12 when the blade 14 is in the deployed position. The structure for performing this function is an end of the stop pin 32 that extends a predetermined distance from the blade 14 to engage with a surface defined by the chassis 12 when the blade 14 is in the deployed position to prevent movement of the blade 14 with respect to the chassis 12. In particular embodiments, the stop pin 32 may be simply a projection from the tang 30, while in other embodiments, the stop pin 32 may be a separate part threaded or press-fit into the tang 30 of the blade 14. In other particular embodiments, the surface defined by the chassis 12 may be arcuate or curved. Moreover, the end of the stop pin 32 may be tapered, and the surface defined by the chassis 12 may be angled to match the tapered end of the stop pin 32.

Figure 5:
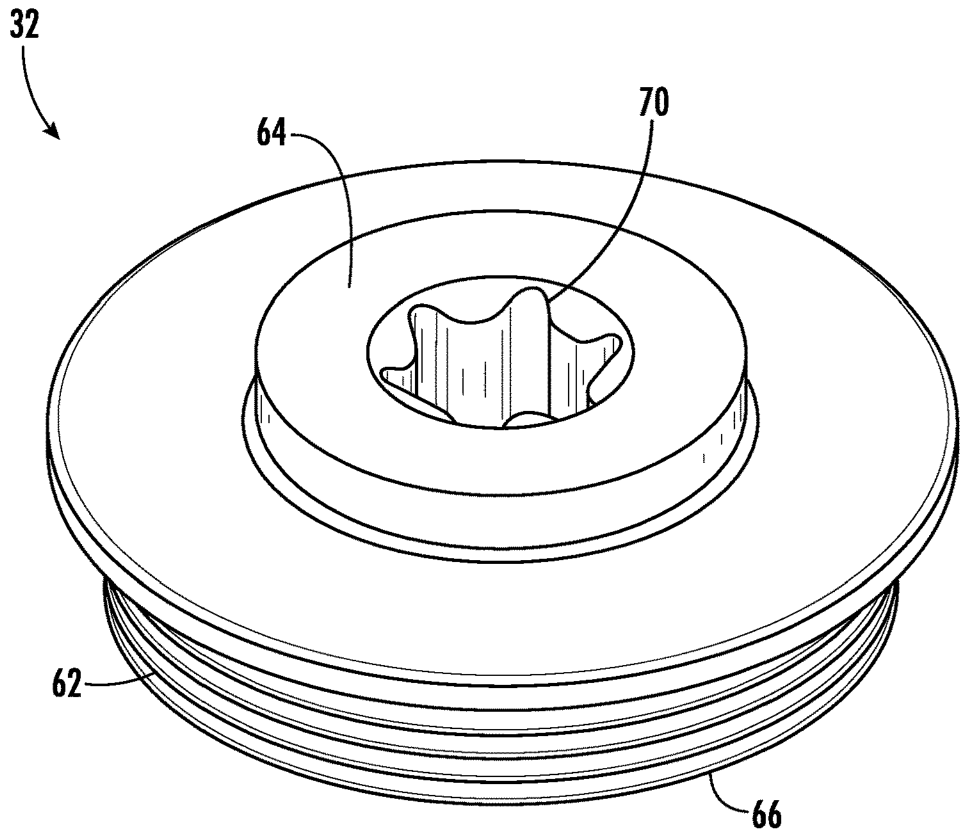
FIG. 5 is a perspective view of a stop pin shown in FIG. 4 according to one embodiment of the present invention.
Figure 6:
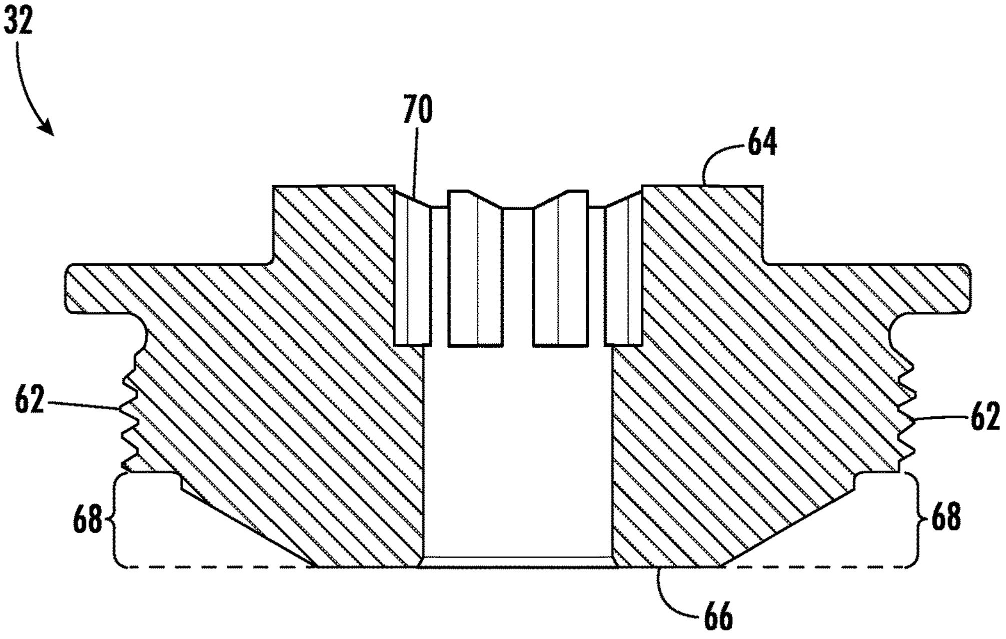
FIG. 6 is a side cross-section view of the stop pin shown in FIG. 5 taken along 6-6.

FIG. 5 provides a perspective view of the stop pin 32 shown in FIG. 4 according to one embodiment of the present invention, and FIG. 6 provides a side cross-section view of the stop pin 32 shown in FIG. 5 taken along 6-6. As shown in FIGS. 5 and 6, the stop pin 32 may include threads 62 between a first end 64 opposed to a second end 66. The threads 62 of the stop pin 32 allow the stop pin 32 to be threadingly engaged with complementary threads in the aperture 31 in the tang 30 of the blade 14. When installed in the aperture 31 in the tang 30, the first end 64 of the stop pin 32 extends above the tang 30 of the blade 14 for engagement with the front or rear operators 40, 42 when retracting or deploying the blade 14, respectively, as previously described. As shown in FIG. 6, the second end 66 of the stop pin 32 may be tapered. When installed in the aperture 31 in the tang 30, the second end 66 of the stop pin 32 extends a predetermined distance 68 from the tang 30 of the blade 14 to wedge against the chassis 12 when the blade 14 is in the deployed position.

Figure 7:
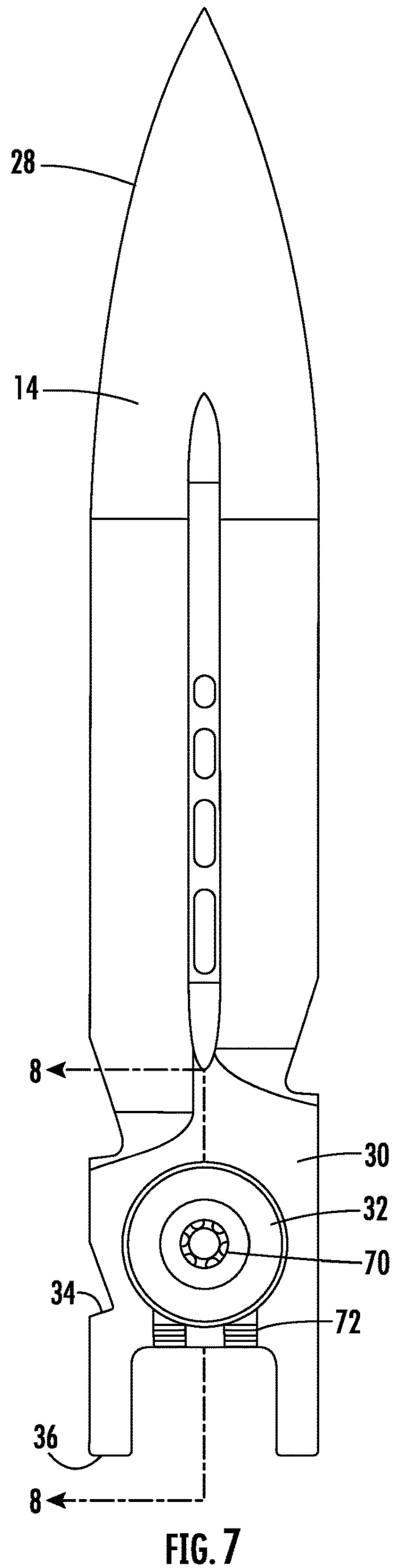
FIG. 7 is a left plan view of the stop pin installed in the tang of the blade according to one embodiment of the present invention.
Figure 8:
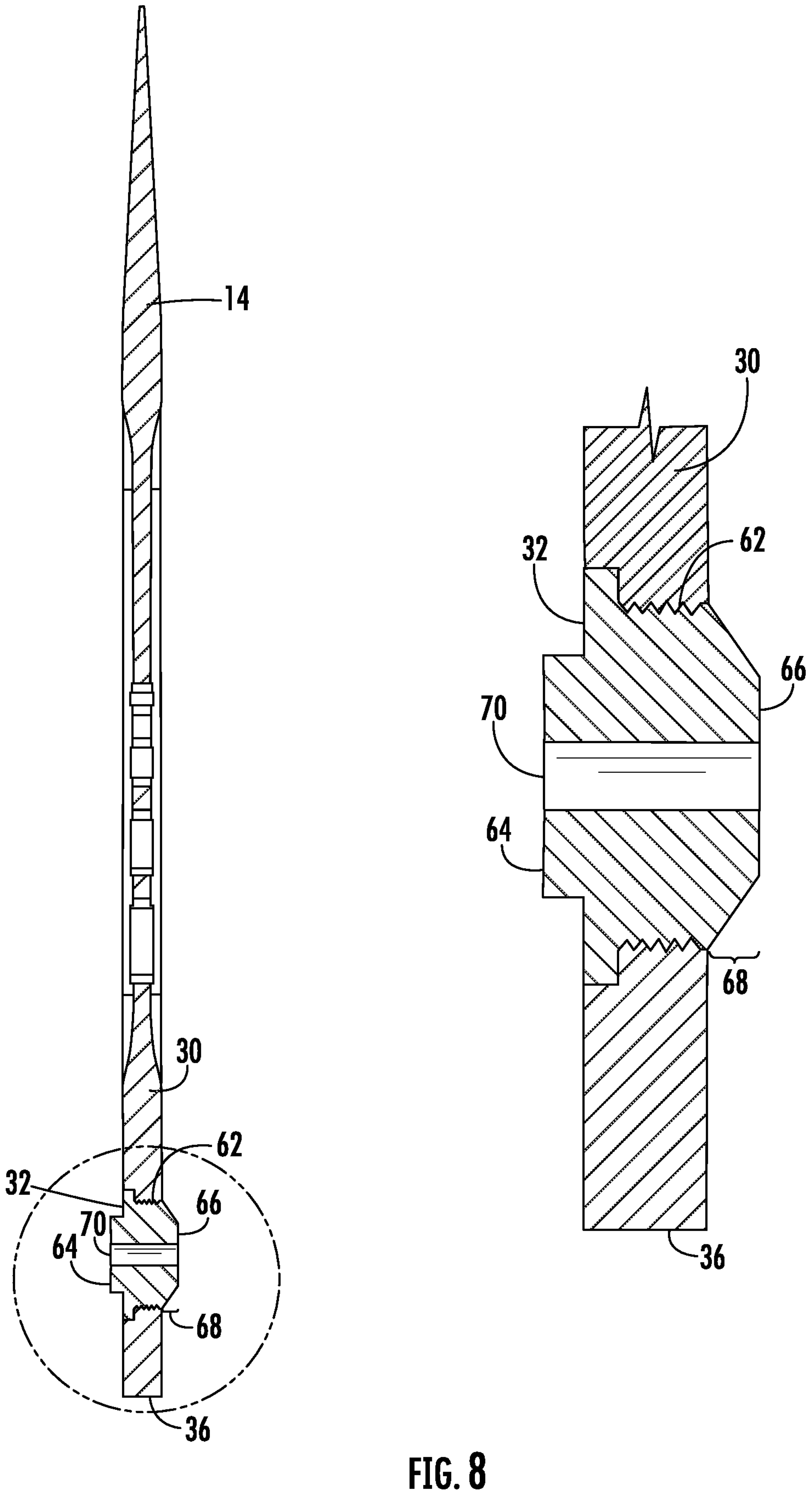
FIG. 8 is a cross-section view of the tang of the blade shown in FIG. 7 taken along 8-8.

FIG. 7 provides a left plan view of the stop pin 32 installed in the aperture 31 in the tang 30 of the blade 14, and FIG. 8 provides a cross-section view of the tang 30 of the blade 14 shown in FIG. 7 taken along 8-8. As shown in FIG. 7, the threads 62 of the stop pin 32 provide threaded engagement with complementary threads in the aperture 31 in the tang 30 of the blade 14. As shown most clearly in FIG. 8, the first end 64 of the stop pin 32 extends above the tang 30 of the blade 14 for engagement with the front or rear operators 40, 42 when retracting or deploying the blade 14, respectively, as previously described, and the second end 66 of the stop pin 32 extends the predetermined distance 68 from the tang 30 of the blade 14 to wedge against the chassis 12 when the blade 14 is in the deployed position.

In particular embodiments, the predetermined distance 68 that the second end 66 of the stop pin 32 extends from the blade 14 may be adjustable to optimize the engagement between the second end 66 of the stop pin 32 and the chassis 12. As shown in FIGS. 5-8, for example, embodiments of the present invention may further include a means for adjusting the predetermined distance 68 that the second end 66 of the stop pin 32 extends from the blade 14. The function of the means is to adjust the predetermined distance 68 that the second end 66 of the stop pin 32 extends from the blade 14. The structure for performing this function is the threads 62 of the stop pin 32 that allow rotation of the stop pin 32 in the aperture 31 to raise or lower the stop pin 32 in the aperture 31 of the tang 30. In particular embodiments, a surface feature 70 in the first or second ends 64, 66 of the stop pin 32 may to facilitate precise rotation of the stop pin 32 in the aperture 31 to finely adjust the predetermined distance 68 that the second end 66 of the stop pin 32 extends from the blade 14. The surface feature 70 may be any shape or size to fit a tool used to rotate the stop pin 32 in the aperture 31. Alternately or in addition, as shown in FIG. 7, one or more set screws 72 may be threadingly engaged with the blade 14 to extend into the aperture 31 and against the stop pin 32 to prevent the stop pin 32 from rotating in the aperture 31 and lock the second end 66 of the stop pin 32 at the predetermined distance 68 from the blade 14.

Figure 9:
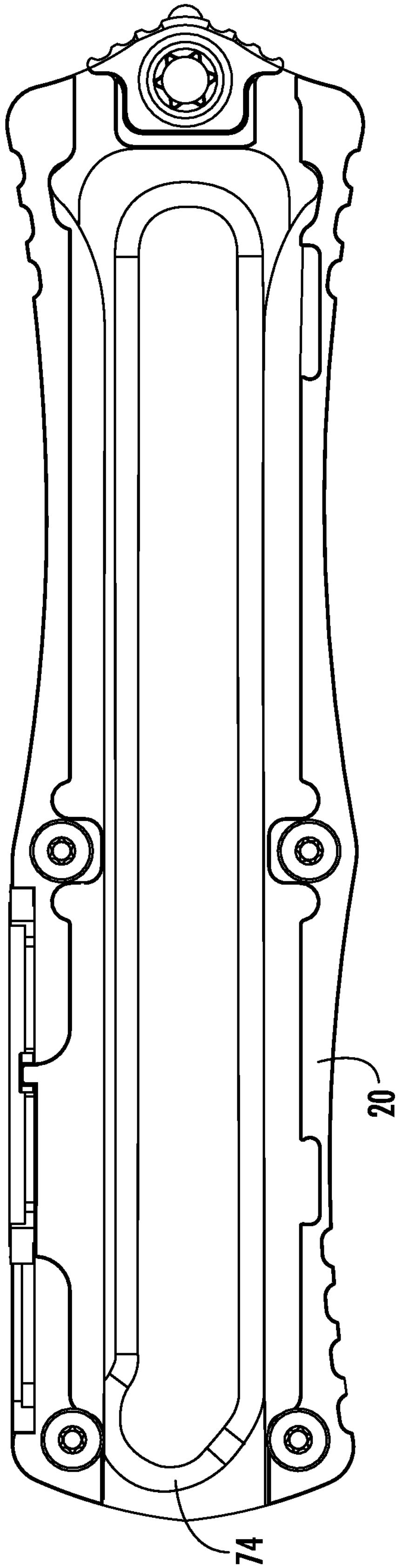
FIG. 9 is a left plan view of the right scale shown in FIG. 4 according to one embodiment of the present invention.

FIG. 9 provides a left plan view of the right scale 20 of the chassis 12 shown in FIG. 4 according to one embodiment of the present invention. As shown in FIG. 9, an angled surface 74 defined by the chassis 12 may curve around the front portion of the inside of the right scale 20. The purpose of the angled surface 74 defined by the chassis 12 is to engage with the second end 66 of the stop pin 32 when the blade 14 is in the deployed position to prevent movement of the blade 14 with respect to the chassis 12. In particular embodiments, the angled surface 74 defined by the chassis 12 may match the tapered second end 66 of the stop pin 32 to wedge the components together to more securely prevent movement of the blade 14 with respect to the chassis 12 when the blade is in the deployed position.

Operation of the pocket knife 10 between the retracted and deployed positions will now be described with respect to FIGS. 10-13. As shown in FIG. 10, the actuator 16 is in the shut position, and the slider 48 is in the rear position with the blade 14 retracted inside the cavity 26. With the blade 14 in the retracted position, the rear operator 42 is engaged with first end 64 of the stop pin 32 in the tang 30, and the rear lock 46 is engaged with the notch 34 in the tang 30 to retain the blade 14 in the retracted position.

To deploy the blade 14, the actuator 16 is moved forward to the open position as shown in FIG. 11, and the engagement between the tab 60 and the actuator 16 causes the slider 48 to move forward with the actuator 16. As the slider 48 initially moves forward, the rear lock 46 remains engaged with the notch 34 in the tang 30 to prevent the blade 14 from moving, and the front of the slider 48 engages with the front operator 40 to move the front operator 40 forward and increase tension in the springs 38 between the front and rear operators 40, 42. Eventually, the rear sloped surface 58 of the slider 48 disengages the rear lock 46 from the notch 34 to release the blade 14, as shown in FIG. 11.

When the rear lock 46 disengages from the notch 34, the tension in the springs 38 pulls the rear operator 42 against the first end 64 of the stop pin 32 in the tang 30 to eject the blade 14 out of the cavity 26 to the deployed position, as shown in FIG. 12. The blade 14 moves out of the cavity 26 until the first end 64 of the stop pin 32 contacts the front operator 40 to prevent further travel of the blade 14 out of the cavity 26. As shown in FIG. 12, the actuator 16 is in the open position with the blade 14 deployed outside of the cavity 26. In the deployed position, the front operator 40 is engaged with the first end 64 of the stop pin 32, and the front lock 44 is engaged with the rear surface 36 of the tang 30 to hold the blade 14 in the deployed position. In addition, the tapered second end 66 of the stop pin 32 is wedged against the angled and curved surface 74 defined by the right scale 20 of the chassis 12 to prevent movement of the blade 14 with respect to the chassis 12.

To retract the blade 14, the actuator 16 is moved rearward to the shut position as shown in FIG. 13, and the engagement between the tab 60 and the actuator 16 causes the slider 48 to move rearward with the actuator 16. As the slider 48 initially moves rearward, the front lock 44 remains engaged with the rear surface 36 of the tang 30 to prevent the blade 14 from moving, and the rear of the slider 48 engages with the rear operator 42 to move the rear operator 42 rearward and increase tension in the springs 38 between the front and rear operators 40, 42. Eventually, the front sloped surface 56 of the slider 48 disengages the front lock 44 from the rear surface 36 of the tang 30 to release the blade 14, as shown in FIG. 13.

When the front lock 44 disengages from the rear surface 36 of the tang 30, the tension in the springs 38 pulls the front operator 40 against the first end 64 of the stop pin 32 in the tang 30 to pull the blade 14 into the cavity 26 to the retracted position, as shown in FIG. 10. The blade 14 moves into the cavity 26 until the first end 64 of the stop pin 32 contacts the rear operator 42, and the rear lock 46 again engages with the notch 34 in the tang 30 to retain the blade 14 in the retracted position.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A pocket knife, comprising:
- a chassis;
- a surface defined by the chassis;
- a blade having a fully retracted position in which the blade is inside of the chassis and a fully deployed position in which at least a portion of the blade is outside of the chassis;
- an actuator slidingly engaged with the chassis and configured to reposition the blade between the fully retracted and fully deployed positions;
- a stop pin connected to the blade; and
- an end of the stop pin extends a predetermined distance from the blade to engage with the surface defined by the chassis when the blade is in the fully deployed position to prevent movement of the blade with respect to the chassis.

2. The pocket knife as in claim 1, wherein the surface defined by the chassis is curved.

3. The pocket knife as in claim 1, wherein the end of the stop pin is tapered and the surface defined by the chassis is angled to match the tapered end of the stop pin.

4. The pocket knife as in claim 1, further comprising a means for adjusting the predetermined distance that the end of the stop pin extends from the blade.

5. The pocket knife as in claim 1, wherein the stop pin is in threaded engagement with the blade.

6. The pocket knife as in claim 1, further comprising a set screw in threaded engagement with the blade to lock the end of the stop pin at the predetermined distance from the blade.

7. The pocket knife as in claim 1, further comprising a lock pivotally connected to the chassis and engaged with the blade in the fully deployed position to lock the blade in the fully deployed position.

8. A pocket knife, comprising:
- a chassis;
- a blade having a retracted position in which the blade is inside of the chassis and a deployed position in which at least a portion of the blade is outside of the chassis;
- an actuator slidingly engaged with the chassis and configured to reposition the blade between the retracted and deployed positions;
- a lock pivotally connected to the chassis and engaged with the blade in the deployed position to lock the blade in the deployed position;
- a stop pin connected to the blade; and
- an end of the stop pin extends a predetermined distance from the blade to engage with the chassis when the blade is in the deployed position to prevent movement of the blade with respect to the chassis.

9. The pocket knife as in claim 8, wherein the stop pin is in threaded engagement with the blade.

10. The pocket knife as in claim 8, further comprising a means for adjusting the predetermined distance that the end of the stop pin extends from the blade.

11. The pocket knife as in claim 8, further comprising a set screw in threaded engagement with the blade to lock the end of the stop pin at the predetermined distance from the blade.

12. The pocket knife as in claim 8, wherein the chassis defines a curved surface, and the engagement between the end of the stop pin and the chassis when the blade is in the deployed position to prevent movement of the blade with respect to the chassis is between the end of the stop pin and the curved surface defined by the chassis.

13. The pocket knife as in claim 12, wherein the end of the stop pin is tapered and the curved surface defined by the chassis is angled to match the tapered end of the stop pin.

14. A pocket knife, comprising:

a chassis;

a blade having a fully retracted position in which the blade is inside of the chassis and a fully deployed position in which at least a portion of the blade is outside of the chassis;

an actuator slidingly engaged with the chassis and configured to reposition the blade between the fully retracted and fully deployed positions;

a means for preventing movement of the blade with respect to the chassis when the blade is in the fully deployed position.

15. The pocket knife as in claim 14, wherein the means for preventing movement of the blade with respect to the chassis when the blade is in the fully deployed position comprises a curved surface defined by the chassis.

16. The pocket knife as in claim 14, wherein the means for preventing movement of the blade with respect to the chassis when the blade is in the fully deployed position comprises a stop pin in threaded engagement with the blade.

17. The pocket knife as in claim 16, wherein an end of the stop pin extends a predetermined distance from the blade to engage with the chassis when the blade is in the fully deployed position, and further comprising means for adjusting the predetermined distance that the end of the stop pin extends from the blade.

18. The pocket knife as in claim 16, wherein an end of the stop pin extends a predetermined distance from the blade to engage with the chassis when the blade is in the fully deployed position, and further comprising a set screw in threaded engagement with the blade to lock the end of the stop pin at the predetermined distance from the blade.

19. The pocket knife as in claim 14, further comprising a lock pivotally connected to the chassis and engaged with the blade in the fully deployed position to lock the blade in the fully deployed position.

* * * * *